US010536869B2

(12) United States Patent
Yao et al.

(10) Patent No.: US 10,536,869 B2
(45) Date of Patent: Jan. 14, 2020

(54) MEASUREMENT REPORT STOPPING METHOD AND ENODEB USING THE SAME

(71) Applicant: Telefonaktiebolaget L M Ericsson (publ), Stockholm (SE)

(72) Inventors: Yong Yao, Jiangsu (CN); Qing Huang, Jiangsu (CN); Angelo Centonza, Hampshire (GB)

(73) Assignee: TELEFONAKTIEBOLAGET LM ERICCSSON (PUBL), Stockholm (SE)

( * ) Notice: Subject to any disclaimer, the term of this patent is extended or adjusted under 35 U.S.C. 154(b) by 313 days.

(21) Appl. No.: 14/766,198

(22) PCT Filed: Jul. 31, 2015

(86) PCT No.: PCT/CN2015/085718
§ 371 (c)(1),
(2) Date: Aug. 6, 2015

(87) PCT Pub. No.: WO2016/019832
PCT Pub. Date: Feb. 11, 2016

(65) Prior Publication Data
US 2016/0255528 A1    Sep. 1, 2016

(30) Foreign Application Priority Data

Aug. 8, 2014    (WO) ................ PCT/CN2014/083977

(51) Int. Cl.
*H04W 24/10*    (2009.01)
(52) U.S. Cl.
CPC .................... *H04W 24/10* (2013.01)
(58) Field of Classification Search
CPC ................................................. H04W 24/10
See application file for complete search history.

(56) References Cited

U.S. PATENT DOCUMENTS

| 2010/0014426 | A1* | 1/2010 | Cavalli | ................. | H04W 36/22 370/235 |
| 2011/0250882 | A1* | 10/2011 | Gao | ...................... | H04W 24/10 455/423 |

(Continued)

FOREIGN PATENT DOCUMENTS

| CN | 101577927 A | 11/2009 |
| CN | 101610537 A | 12/2009 |

(Continued)

OTHER PUBLICATIONS

International Search Report and the Written Opinion for Application No. PCT/CN2015/085718, dated Nov. 3, 2015, 12 pages.

(Continued)

*Primary Examiner* — Andrew Lai
*Assistant Examiner* — M Mostazir Rahman
(74) *Attorney, Agent, or Firm* — Nicholson De Vos Webster & Elliott LLP

(57) ABSTRACT

The present disclosure provides a method of requesting for a measurement report, comprising steps of: setting, in a request message, a first field for indicating an action on measurement to be stop and a second field including cell information for which a stop action on measurement is needed, so as to indicate a reporting eNB to stop measurement reports according to the second field; and transmitting to the reporting eNB the request message for the measurement report. The present disclosure also provides a requesting eNB using the above method, a method of stopping a measurement report by a reporting eNB and a reporting eNB using the above method, as well as a computer readable recording medium comprising computer instructions for executing the above methods.

13 Claims, 4 Drawing Sheets

Scenario 100

Scenario 100'

(56) References Cited

U.S. PATENT DOCUMENTS

| | | | | |
|---|---|---|---|---|
| 2012/0315890 A1* | 12/2012 | Suzuki | ................. | H04W 24/10 |
| | | | | 455/422.1 |
| 2015/0029907 A1* | 1/2015 | Cucala Garcia | ...... | H04L 5/0073 |
| | | | | 370/278 |
| 2017/0155482 A1* | 6/2017 | Xiong | .................... | H04B 7/022 |

FOREIGN PATENT DOCUMENTS

| | | | | |
|---|---|---|---|---|
| CN | 102196485 A | | 9/2011 | |
| CN | 102257846 A | | 11/2011 | |
| CN | 101577927 B | | 2/2012 | |
| CN | 102685811 A | | 9/2012 | |
| CN | 103152774 A | | 6/2013 | |
| CN | 104936184 A | * | 9/2015 | ............ H04B 7/022 |
| EP | 2381715 A1 | | 10/2011 | |
| EP | 2830383 A1 | * | 1/2015 | ........... H04L 5/0073 |
| WO | 2010078681 A1 | | 7/2010 | |
| WO | 2012/005633 A1 | | 1/2012 | |

OTHER PUBLICATIONS

Ericsson, "Solution for Partial Stop of Periodic Measurement Reports for Inter eNB CoMP", 3GPP TSG-RAN WG3 #85bis, R3-142435, Oct. 6-10, 2014, 7 pages.

NEC, "Correction of Resource Status Reporting Initiation procedure", 3GPP TSG-RAN WG3 Meeting #71, R3-110699, Feb. 21-25, 2011, 5 pages.

International Preliminary Report on Patentability for Application No. PCT/CN2015/085718, dated Dec. 7, 2016, 21 pages.

3rd Generation Partnership Project; Technical Specification Group Radio Access Network; Evolved Universal Terrestrial Radio Access Network (E-UTRAN); X2 application protocol (X2AP) (Release 10), 3GPP TS 36.423 V10.5.0 (Mar. 2012), pp. 1-132.

3GPP TS 36.423 V12.2.0 (Jun. 2014), "X2 application protocol (X2AP)," 3rd Generation Partnership Project; Technical Specification Group Radio Access Network; Evolved Universal Terrestrial Radio Access Network (E-UTRAN); (Release 12), Jun. 2014; 151 pages.

CMCC, "Clarification on X2 Load Balancing," 3GPP TSG-RAN WG3 Meeting #61, R3-082133, Aug. 18-22, 2008, 3 pages.

Extended European Search Report for Application No. 15830482.4, dated Feb. 13, 2018, 10 pages.

NEC, Change Request for 36.423 V8.3.0, "Load Balancing Framework Details," 3GPP TSG-RAN WG3 #62, R3-083362, Prague, Czech Republic, Nov. 10-14, 2008, 28 pages.

First Office Action and Search Report from foreign counterpart Chinese Patent Application No. 201580051480.7, dated Aug. 15, 2019, 20 pages (Translation available only for office action).

* cited by examiner

Scenario 100

Scenario 100'

MEASUREMENT REPORT STOPPING METHOD AND ENODEB USING THE SAME

CROSS-REFERENCE TO RELATED APPLICATIONS

This application is a National stage of International Application No. PCT/CN2015/085718, filed Jul. 31, 2015, which claims priority to International Application No. PCT/CN2014/083977, filed Aug. 8, 2014, which are hereby incorporated by reference.

TECHNICAL FIELD

The present disclosure relates to wireless communication field, and particularly to radio network layer signaling procedures of a control plane between two base stations.

BACKGROUND

In order to achieve better network performance, a self-optimized network is necessary. For example, a load balance feature for the self-optimized network needs resource status exchange between eNBs (eNodeBs).

In current X2AP (Application Protocol) specifications in 3GPP TS36.423: "Evolved Universal Terrestrial Radio Access Network (E-UTRAN); X2 application protocol (X2AP)", a Resource Status Reporting Initiation procedure is introduced for resource status exchange between different eNBs through X2 interface, and may be used by one of the eNBs to request reporting of load measurements to another eNB. That is, it is possible to setup a measurement report of certain information on a per cell basis by means of the Resource Status Reporting Initiation procedure.

In particular, the following types of load measurements information can be set for periodic updating:
PRB Utilisation
TNL load Indication
HW (Hardware) Load Indication
Composite Available Capacity
ABS (Almost Blank Subframe) Status A request message, e.g. a RESOURCE STASTUS REQUEST message, may be used in the Resource Status Reporting Initiation procedure for both starting and stopping the measurement report of the above information.

As per the X2: RESOURCE STATUS REQUEST message tabular in Table 1 that is taken from TS36.423, in order to start a measurement reporting procedure, a Registration Request IE (Information Element) shall be set in the RESOURCE STASTUS REQUEST message to a value "start", while a list of types of load measurements information to be periodically reported shall be outlined via a bit string in the Report Characteristics IE and a list of cells for which resource status reporting needs to be started shall be specified in a Cell To Report Item IE.

TABLE 1

| IE/Group Name | Presence | Range | IE type and reference | Semantics description | Criticality | Assigned Criticality |
|---|---|---|---|---|---|---|
| \<td colspan="7">RESOURCE STATUS REQUEST message defined in Section 9.1.2.11 of TS 36.423</td> |
| Message Type | M | | 9.2.13 | | YES | reject |
| eNB1 Measurement ID | M | | INTEGER (1 ... 4095, ...) | Allocated by eNB$_1$ | YES | reject |
| eNB2 Measurement ID | C-ifRegistrationRequestStop | | INTEGER (1 ... 4095, ...) | Allocated by eNB$_2$ | YES | ignore |
| Registration Request | M | | ENUMERATED (start, stop, ...) | A value set to "stop", indicates a request to stop all cells measurements. | YES | reject |
| Report Characteristics | O | | BITSTRING (SIZE(32)) | Each position in the bitmap indicates measurement object the eNB$_2$ is requested to report. First Bit = PRB Periodic, Second Bit = TNL load Ind Periodic, Third Bit = HW Load Ind Periodic, Fourth Bit = Composite Available Capacity Periodic, this bit should be set to 1 if at least one of the First, Second or Third bits is set to 1, Fifth Bit = ABS Status Periodic. Other bits shall be ignored by the eNB$_2$. | YES | reject |
| Cell To Report | | 1 | | Cell ID list for which measurement is needed | YES | ignore |
| >Cell To Report Item | | 1 ... \<maxCellineNB> | | | EACH | ignore |
| >>Cell ID | M | | ECGI 9.2.14 | | — | — |
| Reporting Periodicity | O | | ENUMERATED (1000 ms, 2000 ms, 5000 ms, 10000 ms, ...) | | YES | ignore |

TABLE 1-continued

RESOURCE STATUS REQUEST message defined in Section 9.1.2.11 of TS 36.423

| IE/Group Name | Presence | Range | IE type and reference | Semantics description | Criticality | Assigned Criticality |
|---|---|---|---|---|---|---|
| Partial Success Indicator | O | | ENUMERATED (partial success allowed, . . .) | Included if partial success is allowed | YES | ignore |

In order to start reporting measurement of different information at different times and/or for different cells, separate RESOURCE STSTUS REQUEST messages may be sent to a neighboring eNB.

However, in order to stop reporting of such load measurement information, the following mechanism is specified in the current TS36.423:

The stop procedure is initiated with the RESOURCE STATUS REQUEST message sent from a requesting eNB (called eNB1) to a receiving eNB (called eNB2, for it is requested to report the load measurements, it is also called reporting eNB). Upon receipt, the eNB2 shall stop all cells measurements which have been started previously and terminate the reporting, when the received Registration Request IE indicates "stop".

It should be noted that in the current TS 36.423, the Cell To Report IE is mandatory in the RESOURCE STATUS REQUEST message, even if the Registration Request IE is set to "stop". What's more, the minimum value of Cell To Report Item which is included in Cell To Report IE is 1 (see "1 . . . <maxCellineNB>" in Table 1) which indicates at least one cell ID should also be included in Cell To Report IE. In case that the eNB2 receives the Registration Request IE set to "stop", the list of cells included in Cell To Report IE is ignored by the eNB2.

The inventors notice that, according to the current stop procedure, since all cells measurements which have been started previously and are ongoing should be stopped when the Registration Request IE is set to "stop", any value included in the Cell to Report Item IE and/or Cell to Report IE will be ignored. As a result, the information, especially the cell list included in the Cell To Report IE, cannot be used to specify a "stop" action only targeting certain cells and information types of the measurements.

Therefore, it is desired to provide an efficient approach for sufficiently utilizing specific IEs in the request message, in order to stop selected measurement reports for specific cells, which have been started previously and are ongoing, according to the actual requirements of the requesting eNB.

SUMMARY

Accordingly, a main object of the present disclosure is to provide an effective an efficient approach for sufficiently utilizing specific IEs in the request message, in order to stop the measurement reports of some of cells which have been started previously and are ongoing, according to the actual requirements of the requesting eNB.

In an aspect, the present disclosure provides an eNB, which may comprise:

a receiving unit, configured to receive, from a first eNB, a request message for a measurement report from the eNB, the request message comprising a first field for indicating an action on measurement and a second field including cell information for which the action on measurement is needed;

a judging unit, configured to judge whether the action indicated by the first field is to start measurement or to stop measurement; and a processing unit, configured to, when the first field indicates to stop measurement, stop measurement reports of cells according to the second field including cell information for which a stop action on measurement is needed.

Preferably, the judging unit is further configured to judge whether the second field is enabled to use the cell information included therein for the stop action on measurement; and the processing unit is further configured to, when the first field indicates to stop measurement and the second field is enabled, stop measurement reports of cells identified by the cell information in the second field, wherein the cells identified by the cell information in the second field is at least a subset of all cells whose measurement reports are ongoing.

Alternatively, the judging unit is further configured to judge whether the second field is enabled to use the cell information included therein for the stop action on measurement; and the processing unit is further configured to, when the first field indicates to stop measurement and the second field is disabled, stop measurement reports of all cells whose measurement reports are ongoing.

Preferably, the judging unit is further configured to judge whether a third field for indicating information types of the measurement exists in the request message; and the processing unit is further configured to, when the first field IE indicates to stop measurement, the second field is enabled and the third field exists, stop measurement reports, with respect to the information types identified by the third field, of the cells identified by the cell information in the second field, wherein the information types identified by the third field is at least a part of all information types whose measurement reports are ongoing.

Alternatively, the judging unit is further configured to judge whether a third field for indicating information types of the measurement exists in the request message; and the processing unit is further configured to, when the first field IE indicates to stop measurement, the second field is enabled and the third field is absent, stop measurement reports, with respect to all information types whose measurement reports are ongoing, of the cells identified by the cell information in the second field.

In another aspect, the present disclosure provides an eNB, comprising:

a setting unit configured to set, in a request message, a first field for indicating an action on measurement to be stop and a second field including cell information for which a stop action on measurement is needed, so as to indicate a second eNB to stop measurement reports according to the second field; and a transmitting unit configured to transmit, to the second eNB the request message for the measurement report.

Preferably, the setting unit is further configured to set the second field to be enabled to use the cell information included therein for the action on measurement, and set the cell information to identify cells whose measurement reports are to be stopped by the eNB, according to an actual requirement of the eNB on the cells, so as to indicate the second eNB to stop the measurement reports of cells identified by the cell information, wherein the cells identified by the cell information in the second field is at least a subset of all cells whose measurement reports are ongoing.

Alternatively, the setting unit is further configured to set the second field to be disabled according to an actual requirement of the eNB on the cells, so as to indicate the eNB to stop measurement reports of all cells whose measurement reports are ongoing.

Preferably, the setting unit is further configured to set, to exist in the request message, a third field for indicating information types of the measurement, according to an actual requirement of the eNB on the information types, so as to indicate the second eNB to stop measurement reports, with respect to the information types identified by the third field, of the cells identified by the cell information in the second field, wherein the information types identified by the third field is at least a part of all information types whose measurement reports are ongoing.

Alternatively, the setting unit is further configured to set in the request message, no third field for indicating information types of the measurement, according to an actual requirement of the eNB on the information types, so as to indicate the eNB to stop measurement reports, with respect to all information types whose measurement reports are ongoing, of the cells identified by the cell information in the second field.

In another aspect, the present disclosure provides an eNB, which may comprise: a receiving unit, configured to receive, from a first eNB, a request message for a measurement report from the eNB, the request message comprising a first field for indicating an action on measurement and a third field for indicating information types of the measurement;

a judging unit, configured to judge whether the action indicated by the first field is to start measurement or to stop measurement; and a processing unit, configured to, when the first field indicates to stop measurement, stop measurement reports, with respect to the information types identified by the third field, wherein the information types identified by the third field is at least a part of all information types whose measurement reports are ongoing.

In another aspect, the present disclosure provides a method of stopping a measurement report, comprising steps of:

receiving, from a first eNB, a request message for a measurement report from a second eNB, the request message comprising a first field for indicating an action on measurement and a second field including cell information for which the action on measurement is needed;

judging whether the action indicated by the first field is to start measurement or to stop measurement; and stopping measurement reports of cells according to the second field indicating the cell information for which a stop action on measurement is needed when the first field indicates to stop measurement.

Preferably, the method further comprises:

judging whether the second field is enabled to use the cell information included therein for the stop action on measurement; and stopping measurement reports of cells identified by the cell information in the second field when the first field indicates to stop measurement and the second field is enabled, wherein the cells identified by the cell information in the second field is at least a subset of all cells whose measurement reports are ongoing.

Alternatively, the method further comprises:

judging whether the second field is enabled to use the cell information included therein for the stop action on measurement; and stopping measurement reports of all cells whose measurement reports are ongoing when the first field indicates to stop measurement and the second field is disabled.

Preferably, the method further comprises:

judging whether a third field for indicating information types of the measurement exists in the request message; and stopping measurement reports, with respect to the information types identified by the third field, of the cells identified by the cell information in the second field, when the first field IE indicates to stop measurement, the second field is enabled and the third field exists, wherein the information types identified by the third field is at least a part of all information types whose measurement reports are ongoing.

Alternatively, the method further comprises:

judging whether a third field for indicating information types of the measurement exists in the request message; and stopping measurement reports, with respect to all information types whose measurement reports are ongoing, of the cells identified by the cell information in the second field, when the first field IE indicates to stop measurement, the second field is enabled and the third field is absent.

In another aspect, the present disclosure provides a method of stopping a measurement report, which may comprise:

receiving, from a first eNB, a request message for a measurement report from a second eNB, the request message comprising a first field for indicating an action on measurement and a third field for indicating information types of the measurement;

judging whether the action indicated by the first field is to start measurement or to stop measurement; and stopping measurement reports, with respect to the information types identified by the third field when the first field indicates to stop measurement, wherein the information types identified by the third field is at least a part of all information types whose measurement reports are ongoing.

In another aspect, the present disclosure provides a method of requesting for a measurement report, comprising steps of:

setting, in a request message, a first field for indicating an action on measurement to be stop and a second field including cell information for which a stop action on measurement is needed, so as to indicate a second eNB to stop measurement reports according to the second field; and transmitting to the second eNB the request message for the measurement report.

Preferably, the setting step further comprises:

setting the second field to be enabled to use the cell information included therein for the action on measurement, and setting the cell information to identify cells whose measurement reports are to be stopped by the second eNB according to an actual requirement of a first eNB on the cells, so as to indicate the second eNB to stop the measurement reports of cells identified by the cell information, wherein the cells identified by the cell information in the second field is at least a subset of all cells whose measurement reports are ongoing.

Alternatively, the setting step further comprises:

setting the second field to be disabled according to an actual requirement of a first eNB on the cells, so as to indicate the second eNB to stop measurement reports of all cells whose measurement reports are ongoing.

Preferably, the setting step further comprises:

setting, to exist in the request message, a third field for indicating information types of the measurement, according to an actual requirement of the first eNB on the information types, so as to indicate the second eNB to stop measurement reports, with respect to the information types identified by the third field, of the cells identified by the cell information in the second field, wherein the information types identified by the third field is at least a part of all information types whose measurement reports are ongoing.

Alternatively, the setting step further comprises:

setting, in the request message, no third field for indicating information types of the measurement, according to an actual requirement of the first eNB on the information types, so as to indicate the second eNB to stop measurement reports, with respect to all information types whose measurement reports are ongoing, of the cells identified by the cell information in the second field.

In another aspect, the present disclosure provides a computer readable medium having stored thereon computer executable instructions for performing the above methods.

The technical solutions of the present disclosure may at least have beneficial effects as follows:

1) The second field itself needs to be taken into consideration, when the first field in the request message is set to stop reporting measurement. Therefore, the second field should be used for indicating whether to use the cell information included therein for both stop and start action on measurement, which was a redundant field in the legacy procedure for stop action and now is sufficiently utilized for the stop measurement.

2) The current solution carries the drawback that measurements that are still relevant shall be stopped only because some other measurements no longer needed have to be stopped. Hence, measurements for which periodic reporting is still needed will have to be re-initiated, implying extra signaling and disruption of functions that rely on such reporting. In one of our embodiments, the measurement reports of specific cells which are not needed anymore by the requesting eNB can be stopped by using this second field. Thus, the technical solution of the present disclosure may sufficiently use the current fields in the request message for partially stopping the cells whose measurement reports do not need any longer due to the actual requirements of the requesting eNB. What's more, because another request for measurement procedure is avoided, continuity of the measurement report for the cells that are still relevant may be kept well.

3) When the second field is disabled in stop action, it is no need to include any cell information in the request message, and the receiving eNB will stop all cells measurement reports once it find out the second field is disabled. In other words, a simple indication may be provided to stop measurement reports of all cells whose measurement reports have been started previously and are ongoing. Thus, signaling overhead can be reduced.

4) When the third field exists in the request message in stop action, it enables to stop the measurement report from the reporting eNB on a per information type basis according to actual requirements of the requesting eNB. This is more efficient and signaling overhead may be reduced, also the continuity of the measurement report for the information types those are still relevant can be kept well.

5) When the third field is absent in the request message, a simple indication may be provided to indicates to stop measurement reports, with respect to all information types whose measurement reports are ongoing, of the cells identified by the cell information in the second field, which can also save the signaling overhead.

BRIEF DESCRIPTION OF THE DRAWINGS

The objects, advantages and characteristics of the present disclosure will be more apparent, according to descriptions of preferred embodiments in connection with the drawings, wherein.

Figure 1A:
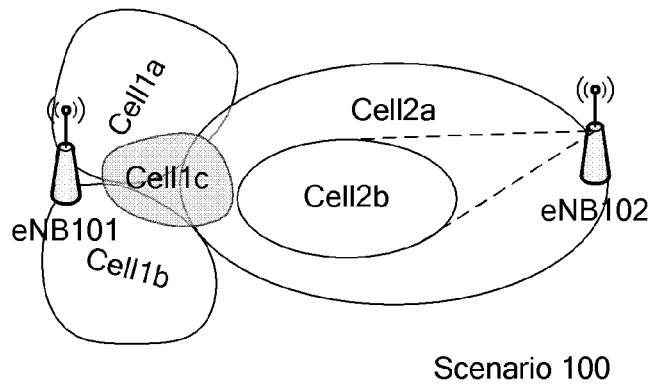
FIGS. 1(a) and 1(b) illustratively show exemplary scenarios 100 and 100' of E-UTRAN to which the present disclosure may be applied, respectively.

It should be noted that various parts in the drawings are not drawn to scale, but only for an illustrative purpose, and thus should not be understood as any limitations and constraints on the scope of the present disclosure.

DETAILED DESCRIPTION

The present disclosure will be further described in detail by referring to the drawings and exemplary embodiments in order to make the objects, technical scheme and advantages of the present disclosure more apparent. In the description, details and functions which are unnecessary to the present disclosure are omitted for clarity. Although the present disclosure is exemplified in a scenario of E-UTRAN, the basic idea may also apply for any other communication systems in which measurement report transmission is required between two base stations.

Figure 1B:
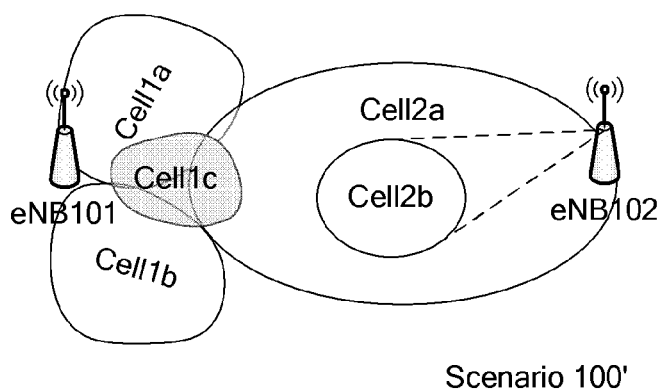

FIGS. 1(a) and 1(b) show exemplary scenarios 100 and 100' of E-UTRAN to which the present disclosure may be applied, respectively. In the exemplary scenario 100 as shown in FIG. 1(a), an eNB (eNodeB) 101 has a plurality of cells, such as Cell1a, Cell1b, Cell1c. The eNB 101 may need to obtain measurement reports from specific cells of a neighboring eNB 102 which have a neighboring relationship with the cells in the eNB 101. In the exemplary scenario 100, the eNB 102 also has a plurality of cells, such as Cell2a, Cell2b. The Cell2b of the eNB 102 is a neighbor of the Cell1c of the eNB 101. Thus, it is beneficial for a measurement report of the Cell2b to be received by eNB 101, such measurement report being initiated by a request message, e.g., a RESOURCE STATUS REQUEST message, sent from the eNB 101 to the eNB 102.

However, such a neighbor relationship may change with time. For example, the requesting eNB 101 may deactivate or change shape of cells neighboring some of the reporting eNB 102's cells. In general, the neighbor relationship may change simply because propagation conditions change with time. In the exemplary scenario 100' as shown in FIG. 1(b), the Cell2b may no longer be a neighbor of the Cell1c. In this case, the eNB101 doesn't need to maintain a cell relationship with the Cell2b, and no longer need the measurement report from the Cell2b of the eNB 102.

In order to reduce amount of measurement information reported by the eNB 102 and processed by the eNB101, the eNB101 may benefit from stopping reporting from the Cell2b.

As previously described, however, the current specifications specify that the measurement report from all cells (Cell2a and Cell2b, in this example) in the eNB 102 shall be stopped. This implies that once load measurement reporting of all cells is disabled, an extra signaling needs to be used to initialize another measurement reporting procedure for the load measurement of cells still relevant. Also, continuity of the measurement report for the cells that are still relevant may be severely affected.

In addition, there are redundant IEs in the request message used for the measurement report stopping procedure which is also unnecessary signaling overhead.

In order to resolve the above deficiencies in the prior art, the present disclosure proposes a technical solution for partially stopping the measurement report from the eNB 102 on a per cell and/or per information basis according to actual requirements of the eNB 101 more efficiently and with a reduced signaling overhead.

The basic principle of the present disclosure consists in that in a case that a first field for indicating an action on measurement in the request message is set to "stop":

the eNB 102 is requested to stop measurement reports of cells according to a second field in the request message, the second field indicating the cell information for which the stop action on measurement is needed.

In particular, the eNB 102 is requested to stop measurement reports of cells identified by the cell information in the second field when the second field is enabled, wherein the cells identified by the cell information in the second field is at least a subset of all cells whose measurement reports are ongoing; and to stop measurement reports of all cells whose measurement reports are ongoing, when the second field is disabled.

the eNB 102 is requested to stop measurement reports, with respect to the information types identified by a third field in the request message, the third field indicating information types of the measurement, wherein the information types identified by the third field is at least a part of all information types whose measurement reports are ongoing. If there is no third field in the request message, the eNB 102 is requested to stop all information types whose measurement reports are ongoing.

It should be noted that the above two approaches of stopping measurement reports may be implemented in any feasible combination or separately. That is, the present disclosure proposes to use the second field for stopping measurement reports on a per cell basis, and/or to use the third field for stopping measurement reports on a per information type basis.

Hereinafter, embodiments of the present disclosure will be described in detail respectively from the perspective of a reporting eNB 102, in connection to FIGS. 2-3.

Figure 2:
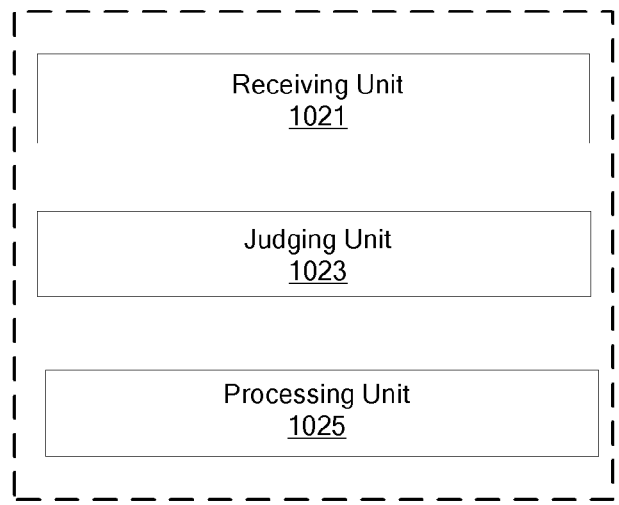
FIG. 2 illustratively shows a block diagram of a reporting eNB according to an exemplary embodiment of the present disclosure.
Figure 3:
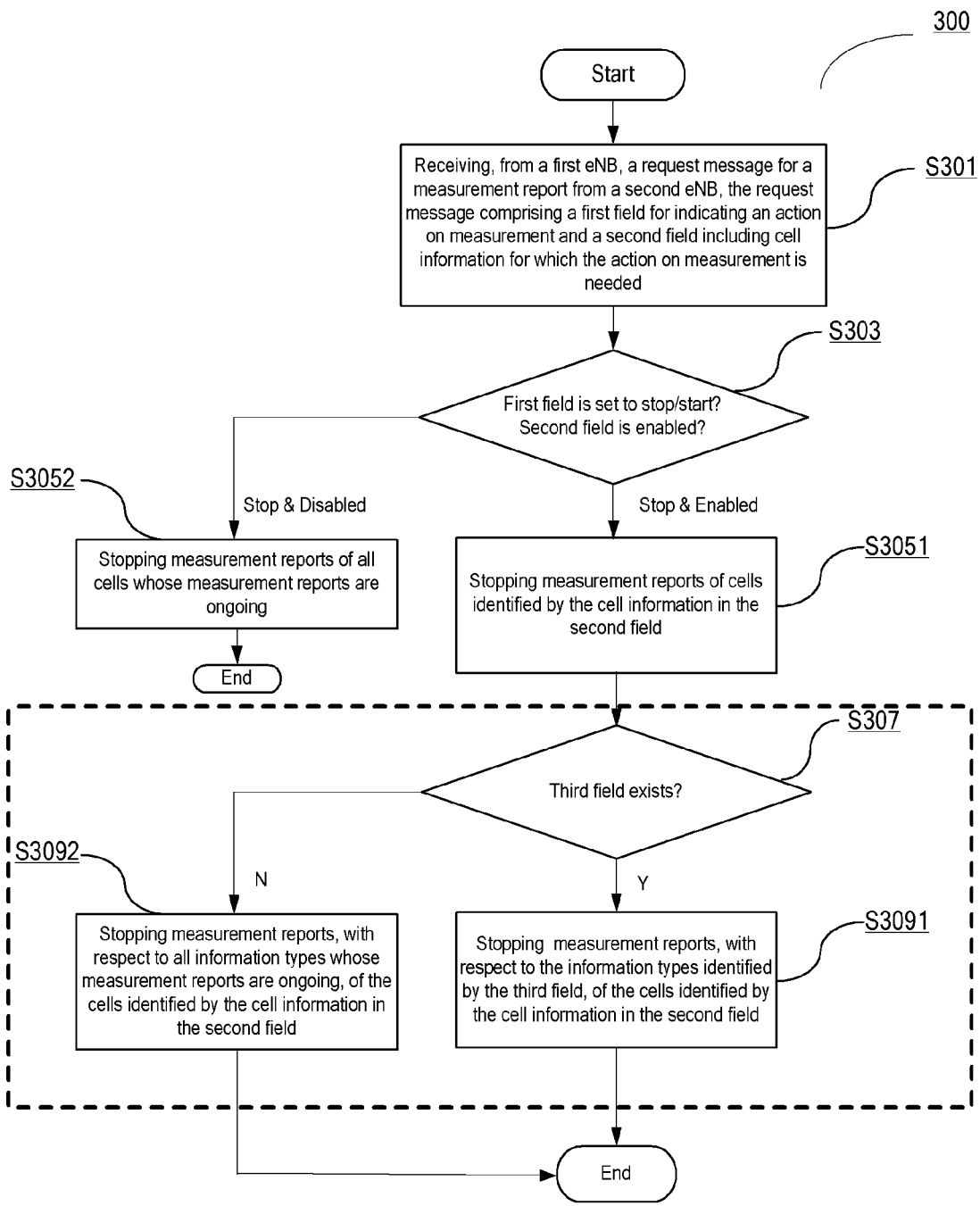
FIG. 3 illustratively shows a flow chart of a method of generating a measurement report according to an exemplary embodiment of the present disclosure.

FIG. 2 illustratively shows a block diagram of a reporting eNB102 according to an exemplary embodiment of the present disclosure, and FIG. 3 illustratively shows a flow chart of a method 500 of generating a measurement report at the reporting eNB102 of FIG. 2 according to the exemplary embodiment of the present disclosure.

As shown in FIG. 2, the reporting eNB 102 may comprise a receiving unit 1021, a judging unit 1023 and a processing unit 1025. As will be understood by the skilled in the art, common components, such as a transmitting unit, in the reporting eNB 102 are omitted in FIG. 2 for simplification, and the description thereof are also omitted here for simplicity.

Hereinafter, the method 300 of generating a load measurement report at the reporting eNB 102 of FIG. 2 will be described in detail with reference to FIG. 3.

As shown in FIG. 3, the method 300 may comprise:

Step S301, in which the receiving unit 1021 of the reporting eNB 102 receives, from the requesting eNB 101, a request message for a measurement report generated by a processing unit of the reporting eNB 102.

Generally, the request message comprises a first field for indicating an action on measurement report, a second field including cell information for which the action on measurement is needed.

For example, the request message may be embodied by a RESOURCE STATUS REQUEST message in a Resource Status Reporting Initiation procedure, the first field may be embodied by a Registration Request IE in the RESOURCE STATUS REQUEST message, the second field may be embodied by a Cell To Report IE in the RESOURCE STATUS REQUEST message, the cell information in the second field may be embodied by a Cell To Report Item IE and Cell ID IE in the Cell To Report IE, which may correspond to the provisions in the 3GPP TS 36.423.

Step S303, in which the judging unit 1023 of the reporting eNB 102 judges whether the action indicated by the first field is to start measurement or to stop measurement, and whether the second field is enabled to use the cell information included therein for the action on measurement.

As well-known by the skilled in the art, if the judging unit 1023 judges that the action indicated by the first field is to start measurement, the second field indicates to use the cell information (e.g. cell IDs) included therein for which the start action on measurement is needed by the requesting eNB 101 according to the actual requirements of the requesting eNB 101; and the third field indicates information types of the measurement according to the actual requirements of the requesting eNB 101. Thus, the reporting eNB 102 generates a response message and starts to report the measurements, with respect to the information types indicated by the third field, of cells identified by the cell information (e.g. cell IDs) in the second field.

In the example where the third field is embodied by the Report Characteristics IE in the RESOURCE STATUS REQUEST message, the Report Characteristics IE is a 32-bit string, in which currently there are five bits indicating five information types (see Semantics description of "Report Characteristics" in Table 1). The information types that the reporting eNB 102 is requested to start reporting may be parts of the information types indicated by the five bits.

As we have described above, when exemplary scenario 100 in FIG. 1(a) changes to exemplary scenario 100' in FIG. 1(b), there would be a specific cell or cells (Cell2b in this example) that the requesting eNB 101 does not need the measurement report thereof any longer.

According to legacy procedure, reporting for all cells with all corresponding types of measurement information previously started has to be stopped at once. Then, extra signaling is needed to initiate another load measurement report procedure for the cells with corresponding types of measurement information that eNB1 still needs.

According to the technical solution of the present disclosure, the reporting eNB 102 may receive a request message from the eNB 101, in which the first field in the request message indicates a stop action on measurement.

If the judging unit 1023 sends its judgment acquired in Step S303 to the processing unit 1025 that the action indicated by the first field is to stop measurement and whether the second field is enabled to use the cell information included therein for the action on measurement or not, the method proceeds to a processing step, in which the processing unit 1025 of the reporting eNB 102 stops measurement reports of cells according to the second field in the request message, the second field containing the cell information for which the stop action on measurement is needed; and generate a response message.

In the processing step, the processing unit 1025 needs to take the second field into consideration. Therefore, in the scheme of the present disclosure, the second field is used for indicating whether to use the cell information included therein for the stop action on measurement, which is different from the current solution where the cell information included in the second field is redundant and ignored.

The technical solution of the present disclosure sufficiently utilizes the current field in the request message for partially stopping the cells whose measurement reports are no longer needed due to the actual requirements of the requesting eNB 101, and meanwhile does not need an extra signaling to be used in order to initialize another measurement reporting procedure for the load measurement of cells that are still relevant, and thus continuity of the measurement report for the cells that are still relevant may be kept well.

There are at least two substituted approaches for stopping measurement reports of cells according to the second field.

In one implementation, the second field is always enabled to use the cell information included therein for the stop action on measurement. When the first field indicates to stop, the eNB 102 may stop measurement reports of cells identified by the cell information in the second field, wherein the cells identified by the cell information in the second field is at least a subset of all cells whose measurement reports have been started previously and are ongoing.

In an example where the second field is embodied by the Cell To Report IE in the RESOURCE STATUS REQUEST message, and the cell information in the second field is embodied by a Cell To Report Item IE and Cell ID (which can be considered as Cell list) in the Cell To Report IE, the Range of Cell To Report IE remains to be 1, which means Cell To Report IE is still mandatory. In case the Registration Request IE is set to "stop", the legacy structure of RESOURCE STATUS REQUEST message doesn't need to be modified in this alternative approach, while the reporting eNB (eNB2) stops the load measurements on cells specified by Cell To Report IE in the RESOURCE STATUS REQUEST message and/or terminate the reporting of the specified cells. As such, the eNB 102 will stop measurement reports of cells identified by the Cell To Report Item IE and Cell ID, wherein the cells identified by the Cell To Report Item IE in the Cell To Report IE is at least a subset of all cells whose measurement reports have been started previously and are ongoing.

In this case, if the eNB 102 is requested to stop all cells whose measurement reports have been started previously and are ongoing, the Cell To Report IE is required to indicate all of cell IDs whose measurement reports have been started previously and are ongoing.

If the eNB 102 is requested to report measurement of Cell A, Cell B and Cell C previously, then a request to stop reporting measurement of Cell A is sent from the eNB1, while measurement reports of Cell B and Cell C remains ongoing. In another request to stop reporting measurement sent from the eNB1, the Cell To Report IE may indicate Cell B (partial stop of the measurement report, also subset of all ongoing measurement) or Cell B and Cell C (all of the ongoing measurement report) in its Cell To Report Item IE and Cell ID IE.

A specified instance includes the following steps:
eNB2 receives a first RESOURCE STATUS REQUEST message sent from eNB1 for initiating a first load measurement report procedure.)
In case that a Registration Request IE in the received RESOURCE STATUS REQUEST message set to "start", eNB2 starts to report the load measurement according to the parameters given in the request. For example, eNB2 starts periodically reporting to eNB1 with load measurements of Cell A and Cell B if Cell To Report IE includes both Cell IDs (Cell A and Cell B) in Cell ID IE. A first RESOURCE STATUS RESPONSE message is sent to eNB1 as well.
eNB2 receives a second RESOURCE STATUS REQUEST message sent from eNB1 for initiating a second load measurement report procedure.)
In case that a Registration Request IE in the second RESOURCE STATUS REQUEST message set to "stop", and a Cell To Report IE in the second request includes only Cell ID of Cell A, eNB2 stops to report load measurement on Cell A and continues to report load measurement on Cell B. A second RESOURCE STATUS RESPONSE message is sent to eNB1 as well.

Thus a "partial stop" function on a per cell basis of load measurement is introduced above. In addition, supposing eNB2 has been requested to report ABS Status and Composite Available Capacity (specified by Report Characteristics) both for Cell A and Cell B in the first load measurement report procedure, the second RESOURCE STATUS REQUEST message requests eNB2 to stop reporting ABS Status of Cell A, eNB2 continues to report the two types of load measurement on Cell B and Composite Available Capacity on Cell A. That is a solution for "partial stop" function on a per information basis.

Considering backwards compatibility, it is needed to ensure interoperability of the legacy procedure and the improved one. It might happen that an eNB supporting partial stop (i.e. stop of measurement reporting on a per cell and/or per information basis) sends a RESOURCE STATUS REQUEST message including a partial stop to another eNB that either does not support the partial stop function because it is a legacy node or it does not support the function because it is disabled/not-activated. Here we add a new Information Element (IE) in the RESOURCE STATUS RESPONSE message. The new IE can be named, e.g. "Partial Stop Response", it can be optional with criticality "reject" and it may be encoded as an ENUMERATED (Partial Stop Successful, Partial Stop Unsuccessful, . . . ). When a RESOURCE STATUS REQUEST message is sent by the requesting eNB aiming to stop a part of ongoing measurement report, the receiving eNB (it's also the reporting node) can:
 a. If partial stop is not supported because the receiving eNB is a legacy eNB, the Partial Stop Response IE will not be included in the RESOURCE STATUS RESPONSE message. The requesting node will understand that the legacy node has stopped measurements according to legacy procedures, i.e. all previously initiated measurements will be stopped and those still needed will need to be re-initiated.

b. If partial stop is not supported because the function is disabled, the Partial Stop Response IE may be included in the RESOURCE STATUS RESPONSE message and set to "Partial Stop Unsuccessful". It would be up to implementation to either stop all measurement reports or continue as before.

c. If partial stop is supported then the Partial Stop Response IE shall be included in the RESOURCE STATUS RESPONSE message and set to "Partial Stop Successful".

Alternatively, in another implementation, the second field may be enabled or disabled (which means optional) to use the cell information included therein for the stop action on measurement. When the first field indicates to stop measurement reporting, and the second field is enabled to use the cell information included therein for the stop action on measurement, the eNB 102 will stop measurement reports of cells identified by the cell information in the second field, wherein the cells identified by the cell information in the second field is at least a subset of all cells whose measurement reports have been started previously and are ongoing. Otherwise, i.e. when the first field indicates to stop measurement reporting, and the second field is disabled to use the cell information included therein for the stop action on measurement, the eNB 102 may stop measurement reports of all cells whose measurement reports have been started previously and are ongoing. When the second field is disabled, there might be null for specific cell information.

In the example where the second field is embodied by the Cell To Report IE in the RESOURCE STATUS REQUEST message, and the cell information in the second field is embodied by a Cell To Report Item IE and Cell ID in the Cell To Report IE, the second field being enabled is embodied to set the Cell To Report IE to 1, which indicates that the cell IDs indicated by the Cell To Report IE will be used for the stop action on measurement. As such, the eNB 102 will stop measurement reports of cells identified by the Cell To Report Item IE, wherein the cells identified by the Cell To Report Item IE in the Cell To Report IE is at least a subset of all cells whose measurement reports have been started previously and are ongoing. When the second field is disabled, the Range of Cell To Report IE is set to 0, which indicates the eNB 102 needs to stop measurement reports of all cells whose measurement reports are ongoing, no matter what is included in the Cell to Report Item IE or Cell ID IE.

As shown in FIG. 3, if the judgment unit 1023 judges that the first field indicates to stop measurement and the second field is enabled in Step S303, the method may proceed to Step S3051.

Step S3051, in which the processing unit 1025 of the reporting eNB 102 may stop measurement reports of cells identified by the cell information in the second field and generate a response message. It will be understood that the cells identified by the cell information in the second field is at least a subset of all cells whose measurement reports are ongoing.

Or, if the judgment unit 1023 judges in Step S303 that the first field indicates stop and the second field is disabled, the method may proceed to Step S3052.

Step S3052, in which the processing unit 1025 of the reporting eNB 102 stops measurement reports of all cells whose measurement reports are ongoing.

Therefore, the method 300 according to the embodiment of the present disclosure may stop the measurement report from the eNB 102 on a per cell basis according to actual requirements of the eNB 101 more efficiently with a reduced signaling overhead.

As previously described with reference to FIGS. 1(*a*) and 1(*b*), when exemplary scenario 100 in FIG. 1(*a*) changes to exemplary scenario 100' in FIG. 1(*b*), there would be a specific cell or cells (Cell2*b* in this example) that the requesting eNB 101 does not need the measurement report thereof any longer. Furthermore, there might also be the need to stop specific measurement reporting, for example if in FIG. 1(*b*) ABS patterns are enabled at Cell1*c* in order to mitigate interference at Cell2*b* and if Cell2*b* is no longer a mobility target of Cell1*c*, measurement reporting of PRB utilization, TNL Load, HW Load, Composite Available Capacity might not be needed, but measurement reporting of ABS Status may still be needed.

In order to partially stop the information types whose measurement reports do not need any longer, the judging unit 1023 may further judge whether a third field for indicating information types of the measurement exists in the request message or not, according to another embodiment of the present disclosure, In the example where the request message may be embodied by a RESOURCE STATUS REQUEST message in a Resource Status Reporting Initiation procedure, and the third field may be embodied by a Report Characteristics IE in the RESOURCE STATUS REQUEST message, which may correspond to the provisions in the 3GPP TS 36.423.

The third field may be used, in order to stop the measurement report from the eNB 102 on a per information type basis according to actual requirements of the eNB 101. In this embodiment, the method 300 of the present disclosure may further comprise Steps S307~3091/3092 which are marked by a dotted-line block in FIG. 3, meaning that those steps are optional:

Step S307, in which the judging unit 1023 judges whether the third field exists in the request message, the third field indicating information types of the measurement.

If the judging unit 1023 judges that the third field exists in the request message, the method may proceed to Step S3091.

Step S3091, in which the processing unit 1025 of the reporting eNB 102 may stop measurement reports, with respect to the information types identified by the third field, of the cells identified by the cell information in the second field, when the first field IE indicates to stop measurement, the second field is enabled and the third field exists. It will be understood that the information types identified by the third field is at least a part of all information types whose measurement reports are ongoing.

Or, if the judgment unit 1023 judges that the third field is absent in the request message, the method may proceed to Step S3092.

Step S3092, in which the processing unit 1025 of the reporting eNB 102 stops measurement reports, with respect to all information types whose measurement reports are ongoing, of the cells identified by the cell information in the second field.

Therefore, the method 300 according to this further embodiment of the present disclosure may stop the measurement report from the eNB 102 on both a per cell and per information type basis according to actual requirements of the eNB 101 more efficiently with a reduced signaling overhead.

The above embodiments of the present disclosure respectively describe the scheme of stopping the measurement report from the eNB 102 on a per cell basis separately and the scheme of stopping the measurement report on both a per cell and per information type basis. Nevertheless, it will be appreciated that the measurement report can also be stopped on only a per information type basis.

In this embodiment, the judging unit 1023 judges whether the first field in the request message indicates to stop measurement, and whether the third field exists in the request message. The processing unit 1025 stops measurement reports, with respect to the information types identified by the third field, of the cells whose measurement reports are ongoing, when the judging unit 1023 judges that the first field indicates to stop measurement and the third field exists.

When the judging unit 1023 judges that the first field indicates to stop measurement and the third field is absent, the processing unit 1025 stops measurement reports, with respect to all information types whose measurement reports are ongoing, when the judging unit 1023 judges that the first field indicates to stop measurement and the third field exists.

As will be understood by the skilled in the art, although the judging operations of the judging unit 1023 in the eNB 102 on the first, second and third fields are performed in different steps in the exemplary method as shown in FIG. 3, the present disclosure is not limited to this. For example, the judging operations on the first, second and third fields may be also performed in a single step simultaneously, or in feasible orders. For example, in the implementation of judging all of the three fields in a single step, the processing unit 1025 may stop measurement reports according to the judgment result of the three fields, similar with steps S3052, S3091 and S3092. Also, it can be understood by the skilled in the art that the methods herein to trigger a partial stop are not only applicable to the information currently available for periodic reporting, but can be extended to any information that will be introduced in the future and that is reported periodically or a-periodically. Any of reasonable possibilities, which are not apart from the concept of the present disclosure and could be contemplated by the skilled in the art, will fall within the scope of the present disclosure.

Hereinafter, embodiments of the present disclosure will be described in detail respectively from the perspective of a requesting eNB 101, in connection to FIGS. 4-5.

Figure 4:
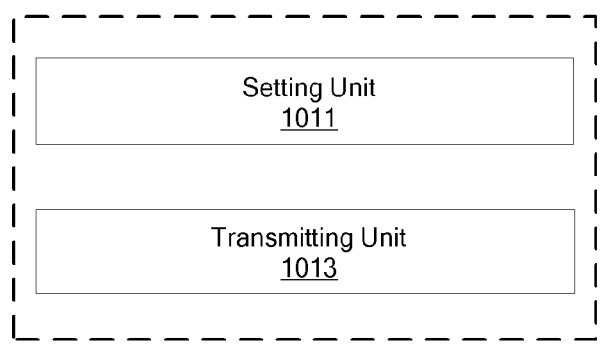
FIG. 4 illustratively shows a block diagram of a requesting eNB according to an exemplary embodiment of the present disclosure.
Figure 5:
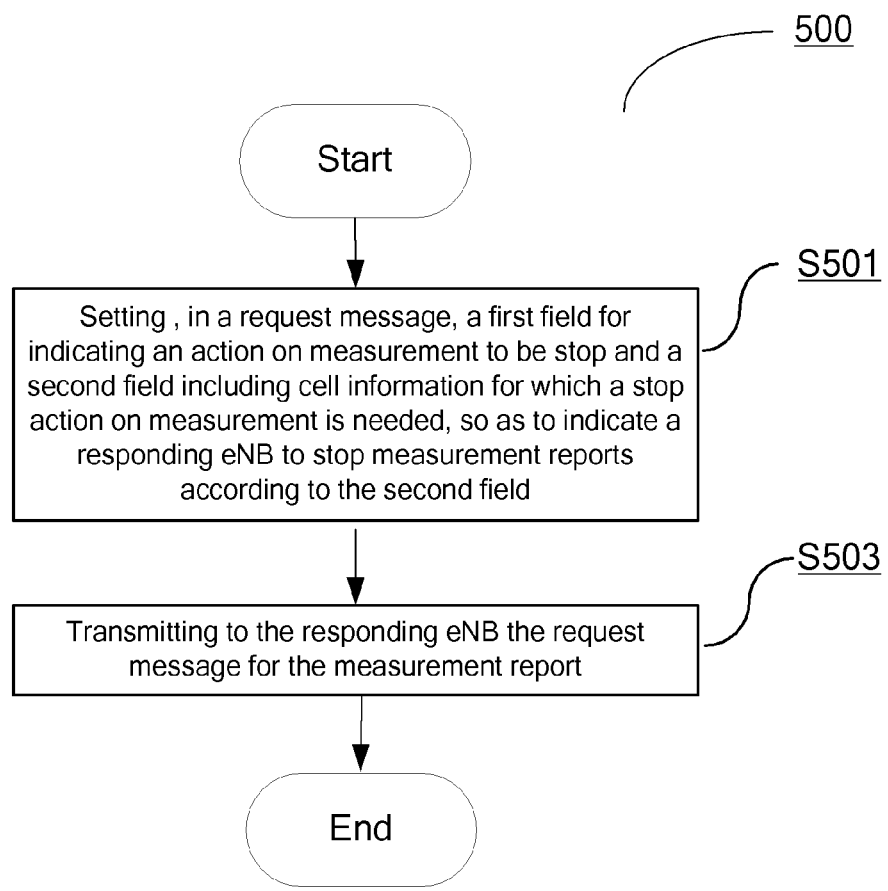
FIG. 5 illustratively shows a flow chart of a method of requesting for a measurement report according to an exemplary embodiment of the present disclosure.

FIG. 4 illustratively shows a block diagram of a requesting eNB101 according to an exemplary embodiment of the present disclosure, and FIG. 5 illustratively shows a flow chart of a method 500 of requesting for a measurement report at the requesting eNB101 of FIG. 4 according to the exemplary embodiment of the present disclosure.

As shown in FIG. 4, the requesting eNB101 may comprise a setting unit 1011 and a transmitting unit 1013. As will be understood by the skilled in the art, common components, such as a receiving unit for receiving a response as well as a requested measurement report, in the requesting eNB 101 are omitted in FIG. 4 for simplification, and the description thereof are also omitted here for simplicity.

Hereinafter, the method 500 of requesting for a measurement report at the requesting eNB101 of FIG. 4 will be described in detail in connection with FIG. 5. It will be recognized that the method 500 of requesting for the measurement report at the requesting eNB101 is substantially corresponding to the method 300 of generating a measurement report at the reporting eNB 102 according to request from the requesting eNB 101, as previously described in detail. Some repetitive descriptions are omitted for simplicity here.

Still with reference to the exemplary scenario in FIG. 1(*b*), the requesting eNB 101 does not need the measurement report of specific cells (Cell2*b* in this example) any longer. Thus, the setting unit 1011 in the requesting eNB 101 may set the request message for the reporting eNB 102 to partially stop measurement report of the specific cells.

As shown in FIG. 5, when the requesting eNB 101 intends to stop the measurement reports of some of cells which have been started previously and are ongoing, the method 500 may comprise:

Step S501, in which the setting unit 1011 of the requesting eNB101 may set, in a request message, a first field for indicating an action on measurement to be stop and a second field including cell information for which a stop action on measurement is needed, so as to indicate the reporting eNB 102 to stop measurement reports according to the second field; and Step S503, in which the transmitting unit 1013 of the requesting eNB101 may transmit, to the reporting eNB 102, the request message for the measurement report.

In particular, the Step S501 performed by the setting unit 1011 of the requesting eNB101 may further comprise: setting the second field to be enabled to use the cell information included therein for the action on measurement, and setting the cell information to identify cells whose measurement reports are to be stopped by the eNB, according to an actual requirement of the eNB 1010 on the cells, so as to indicate the eNB to stop the measurement reports of cells identified by the cell information, wherein the cells identified by the cell information in the second field is at least a subset of all cells whose measurement reports are ongoing.

Alternatively, the Step S501 performed by the setting unit 1011 of the requesting eNB101 may further comprise: setting the second field to be disabled according to an actual requirement of the eNB 1010 on the cells, so as to indicate the eNB to stop measurement reports of all cells whose measurement reports are ongoing.

Therefore, the method 500 according to the embodiment of the present disclosure may request to stop the measurement report from the eNB 102 on a per cell basis according to actual requirements of the eNB 101 more efficiently with a reduced signaling overhead.

Furthermore, in order to stop the measurement report from the eNB 102 on a per information type basis according to actual requirements of the eNB 101, the setting step of the method 500 according to a further embodiment of the present disclosure may further comprise: setting, to exist in the request message, a third field for indicating information types of the measurement, according to an actual requirement of the eNB 101 on the information types, so as to indicate the eNB 102 to stop measurement reports, with respect to the information types identified by the third field, of the cells identified by the cell information in the second field, wherein the information types identified by the third field is at least a part of all information types whose measurement reports are ongoing.

Alternatively, the setting step of the method 500 according to this further embodiment of the present disclosure may further comprise: setting, in the request message, no third field for indicating information types of the measurement, according to an actual requirement of the eNB 101 on the information types, so as to indicate the eNB to stop measurement reports, with respect to all information types whose measurement reports are ongoing, of the cells identified by the cell information in the second field.

Therefore, the method 500 according to this further embodiment of the present disclosure may request to stop the measurement report from the eNB 102 on both a per cell and per information type basis according to actual requirements of the eNB 101 more efficiently with a reduced signaling overhead.

It will be appreciated that embodiments of the present disclosure according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

The present disclosure may sufficiently utilize the current fields in the request message for partially stopping the cells and/or the information types whose measurement reports do not need any longer due to the actual requirements of the requesting eNB 101, and on the other hand, does not need an extra signaling to be used in order to start another reporting procedure for the load information of the cells and/or the information types that are still relevant, and thus continuity of the measurement report for the cells and/or the information types that are still relevant may be preserved.

The above is only the preferred embodiments of the present disclosure and the present disclosure is not limited to the above embodiments. Therefore, any modifications, substitutions and improvements to the present disclosure are possible without departing from the spirit and scope of the present disclosure.

What is claimed is:

1. An evolved Node B (eNodeB), comprising:
a processor and a non-transitory computer readable storage medium coupled to the processor, the non-transitory computer readable storage medium storing instructions, which when executed by the processor, cause the eNodeB to:
receive, from another eNodeB, a request message for a measurement report from the eNodeB, the request message comprising a first field for indicating an action on measurement and a second field including cell information for which the action on the measurement is needed,
judge whether the action indicated by the first field is to stop the measurement and whether the second field is enabled to use the cell information for stopping the measurement, wherein the second field is enabled or not is determined based on a value within a cell to report information element of the request message, and wherein the second field is determined to be enabled when the value within the cell to report information element is set to one, when the first field indicates to stop the measurement and the second field is enabled, perform a partial stop of measurement report by stopping measurement report of one or more cells identified by the cell information in the second field, the cell information corresponding to a subset of all cells whose measurement reports are ongoing, and when the first field indicates to stop the measurement and the second field is disabled, stop measurement reports of all cells to the another eNodeB; and
judge whether a third field for indicating information types of the measurement exists in the request message, and when the first field indicates to stop the measurement, the second field is enabled, and the third field exists, stop measurement reports, with respect to the information types identified by the third field, and of the cells identified by the cell information in the second field, wherein the information types identified by the third field is at least a part of all information types whose measurement reports are ongoing, and wherein the third field includes a report characteristics information element (IE), which includes five bits indicating five information types.

2. The eNodeB according to claim 1, wherein the eNodeB is further to:
when the first field indicates to stop the measurement, the second field is enabled, and the third field is absent, stop measurement reports, with respect to all information types whose measurement reports are ongoing, and of the cells identified by the cell information in the second field.

3. The eNodeB according to claim 1, wherein the eNodeB is further to:
when stopping the measurement reports of the cells according to the second field succeeds, send to the another eNodeB a response message indicating a partial stop success.

4. The eNodeB of claim 1, wherein the first field includes a registration request information element (IE), and wherein the second field includes a cell to report IE list.

5. The eNodeB of claim 4, wherein the registration request IE indicates the action is to stop measurement.

6. The eNodeB of claim 4, wherein the cell to report IE list indicates the subset of all cells whose measurement reports are ongoing.

7. The eNodeB of claim 1, wherein each of the one or more cells whose measurement report is to be stopped is identified through its cell identifier (ID).

8. The eNodeB of claim 1, wherein when the first field indicates to stop the measurement and the second field is disabled, a range of cell to report information element of the request message is set to zero.

9. An evolved Node B (eNodeB), comprising:
a processor and a non-transitory computer readable storage medium coupled to the processor, the non-transitory computer readable storage medium storing instructions, which when executed by the processor, cause the eNodeB to:
receive, from another eNodeB, a request message for a measurement report from the eNodeB, the request message comprising a first field for indicating an action on measurement, a second field including cell information for which the action on measurement is needed, and a third field for indicating information types of the measurement,
judge whether the action indicated by the first field is to stop measurement and whether the second field is enabled to use the cell information for the stop measurement, wherein the second field is enabled or not is determined based on a value within a cell to report information element of the request message, and wherein the second field is determined to be enabled when the value within the cell to report information element is set to one, when the first field indicates to stop measurement and the second field is enabled, perform a partial stop of measurement report by stopping measurement reports, with respect to the information types identified by the third field, wherein the information types identified by the third field is at least a part of all information types whose measurement reports are ongoing, and when the first field indicates to stop the measurement and the second field is disabled, stop measurement reports of all cells to the another eNodeB, and
stop measurement reports, with respect to the information types identified by the third field, and of the cells identified by the cell information in the second field, wherein the information types identified by the third field is at least a part of all information types whose measurement reports are ongoing, and wherein the third field includes a report characteristics information element (IE), which includes five bits indicating five information types.

10. The eNodeB of claim 9, wherein the partial stop of measurement report is to stop measurement report of one or more cells identified by the cell information in the second field, the cell information corresponding to a subset of all cells whose measurement reports are ongoing.

11. A method of stopping measurement reporting, comprising:
receiving, from a first evolved Node B (eNodeB), a request message for a measurement report from a second eNodeB, the request message comprising a first field for indicating an action on measurement and a second field including cell information for which the action on measurement is needed;
judging whether the action indicated by the first field is to stop measurement and whether the second field is enabled to use the cell information for stopping the measurement, wherein the second field is enabled or not is determined based on a value within a cell to report information element of the request message, and wherein the second field is determined to be enabled when the value within the cell to report information element is set to one, when the first field indicates to stop the measurement and the second field is enabled, perform a partial stop of measurement report by stopping measurement report of one or more cells identified by the cell information in the second field, the cell information corresponding to a subset of all cells whose measurement reports are ongoing, and when the first field indicates to stop the measurement and the second field is disabled, stop measurement reports of all cells to the second eNodeB; and
judge whether a third field for indicating information types of the measurement exists in the request message, and when the first field indicates to stop the measurement, the second field is enabled, and the third field exists, stop measurement reports, with respect to the information types identified by the third field, and of the cells identified by the cell information in the second field, wherein the information types identified by the third field is at least a part of all information types whose measurement reports are ongoing, and wherein the third field includes a report characteristics information element (IE), which includes five bits indicating five information types.

12. The method according to claim 11, further comprising:
stopping measurement reports, with respect to all information types whose measurement reports are ongoing, and of the cells identified by the cell information in the second field, when the first field indicates to stop measurement, the second field is enabled, and the third field is absent.

13. A method of stopping measurement reporting, comprising:
receiving, from a first evolved Node B (eNodeB), a request message for a measurement report from a second eNodeB, the request message comprising a first field for indicating an action on measurement, a second field including cell information for which the action on measurement is needed, and a third field for indicating information types of the measurement;
judging whether the action indicated by the first field is to stop measurement and whether the second field is enabled to use the cell information for the stop measurement, wherein the second field is enabled or not is determined based on a value within a cell to report information element of the request message, and wherein the second field is determined to be enabled when the value within the cell to report information element is set to one, and performing a partial stop of measurement report by stopping measurement reports, with respect to the information types identified by the third field when the first field indicates to stop measurement and the second field is enabled, wherein the information types identified by the third field is at least a part of all information types whose measurement reports are ongoing, and stopping measurement reports of all cells to the first eNodeB when the first field indicates to stop the measurement and the second field is disabled; and
stop measurement reports, with respect to the information types identified by the third field, and of the cells identified by the cell information in the second field, wherein the information types identified by the third field is at least a part of all information types whose measurement reports are ongoing, and wherein the third field includes a report characteristics information element (IE), which includes five bits indicating five information types.

* * * * *